United States Patent
Feaviour

(10) Patent No.: US 9,511,351 B2
(45) Date of Patent: Dec. 6, 2016

(54) CATALYSTS FOR USE IN STEAM REFORMING PROCESSES

(75) Inventor: Mark Robert Feaviour, Berkshire (GB)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 480 days.

(21) Appl. No.: 13/981,763

(22) PCT Filed: Feb. 6, 2012

(86) PCT No.: PCT/GB2012/050250
§ 371 (c)(1),
(2), (4) Date: Sep. 10, 2013

(87) PCT Pub. No.: WO2012/110781
PCT Pub. Date: Aug. 23, 2012

(65) Prior Publication Data
US 2014/0005042 A1    Jan. 2, 2014

(30) Foreign Application Priority Data

Feb. 14, 2011    (GB) .................................. 1102502.0

(51) Int. Cl.
*B01J 23/00*    (2006.01)
*B01J 23/63*    (2006.01)
(Continued)

(52) U.S. Cl.
CPC ................. *B01J 23/63* (2013.01); *B01J 23/42* (2013.01); *B01J 23/44* (2013.01); *B01J 23/462* (2013.01);
(Continued)

(58) Field of Classification Search
CPC ........... B01J 23/63; B01J 23/44; B01J 35/008; B01J 23/52; B01J 23/464; B01J 23/755; B01J 23/42; B01J 37/0221; B01J 23/72; B01J 37/0036; B01J 23/892; B01J 35/08; B01J 37/0045; B01J 23/462; B01J 23/83; C01B 2203/1223; C01B 2203/1241; C01B 2203/1217; C01B 2203/1229; C01B 2203/1235; C01B 2203/0244; C01B 2203/1247; C01B 2203/1058; C01B 2203/107; C01B 2203/0233; C01B 3/326; C01B 2203/1064; C01B 3/40
(Continued)

(56) References Cited

U.S. PATENT DOCUMENTS 4,521,618 A    6/1985  Arntz
5,326,735 A *  7/1994  Itoh .................... B01D 53/9418
                                                423/213.5
(Continued)

FOREIGN PATENT DOCUMENTS

DE    2805801    8/1979
GB    2017886    10/1979
(Continued)

OTHER PUBLICATIONS

International Search Report, dated Apr. 19, 2012, from corresponding PCT application.
(Continued)

*Primary Examiner* — Colleen Dunn
*Assistant Examiner* — Haytham Soliman
(74) *Attorney, Agent, or Firm* — Young & Thompson

(57) ABSTRACT

A method is described for preparing a catalyst suitable for use in a steam reforming process, including the steps of: (i) spraying a slurry containing a particulate catalyst compound, including one or more catalytic metals selected from the group consisting of Ni, Cu, Pt, Pd, Rh, Ru and Au, on to the surface of a shaped support in a pan coater to form a coated shaped support material having the catalytic metal in
(Continued)

Figure 1:
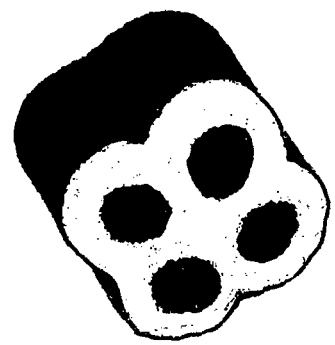

a surface layer, (ii) drying and optionally calcining the coated shaped support material to form a catalyst precursor, and (iii) optionally reducing the metal or metals in the catalyst precursor to a lower oxidation state to form the catalyst. The egg-shell catalyst is useful for performing a steam reforming reaction.

20 Claims, 1 Drawing Sheet

(51) Int. Cl.
| | |
|---|---|
| B01J 23/52 | (2006.01) |
| B01J 23/72 | (2006.01) |
| B01J 23/755 | (2006.01) |
| B01J 35/00 | (2006.01) |
| C01B 3/32 | (2006.01) |
| C01B 3/40 | (2006.01) |
| B01J 23/42 | (2006.01) |
| B01J 23/44 | (2006.01) |
| B01J 23/46 | (2006.01) |
| B01J 23/83 | (2006.01) |
| B01J 23/89 | (2006.01) |
| B01J 35/08 | (2006.01) |
| B01J 37/00 | (2006.01) |
| B01J 37/02 | (2006.01) |

(52) U.S. Cl.
CPC .............. *B01J 23/464* (2013.01); *B01J 23/52* (2013.01); *B01J 23/72* (2013.01); *B01J 23/755* (2013.01); *B01J 23/83* (2013.01); *B01J 23/892* (2013.01); *B01J 35/008* (2013.01); *B01J 35/08* (2013.01); *B01J 37/0036* (2013.01); *B01J 37/0045* (2013.01); *B01J 37/0221* (2013.01); *C01B 3/326* (2013.01); *C01B 3/40* (2013.01); *C01B 2203/0233* (2013.01); *C01B 2203/0244* (2013.01); *C01B 2203/107* (2013.01); *C01B 2203/1058* (2013.01); *C01B 2203/1064* (2013.01); *C01B 2203/1217* (2013.01); *C01B 2203/1223* (2013.01); *C01B 2203/1229* (2013.01); *C01B 2203/1235* (2013.01); *C01B 2203/1241* (2013.01); *C01B 2203/1247* (2013.01)

(58) Field of Classification Search
USPC ........ 502/304, 330, 326, 339, 325, 337, 332
See application file for complete search history.

(56) References Cited

U.S. PATENT DOCUMENTS

| | | | |
|---|---|---|---|
| 5,397,393 A | 3/1995 | Tsujino | |
| 6,177,381 B1 | 1/2001 | Jensen et al. | |
| 6,274,113 B1* | 8/2001 | Heyse | B01J 19/002 |
| | | | 208/48 R |
| 7,176,159 B1 | 2/2007 | Wheelock et al. | |
| 7,541,309 B2* | 6/2009 | Trevino | B01J 23/40 |
| | | | 208/133 |
| 7,772,147 B2* | 8/2010 | Collier | B01D 53/865 |
| | | | 502/232 |
| 2006/0204614 A1* | 9/2006 | Rapp | A23G 3/343 |
| | | | 426/5 |
| 2007/0060778 A1 | 3/2007 | Bogdan et al. | |
| 2007/0128274 A1 | 6/2007 | Zhu | |
| 2008/0248199 A1 | 10/2008 | Gajda | |
| 2009/0018366 A1 | 1/2009 | Berweiler | |

FOREIGN PATENT DOCUMENTS

| | | | |
|---|---|---|---|
| JP | 553-55492 | 5/1978 | |
| JP | EP 1048347 A1 * | 11/2000 | ........... B01J 23/462 |
| JP | 2006-181399 | 7/2006 | |
| WO | 2010/125369 A2 | 11/2010 | |
| WO | 2011/021024 | 2/2011 | |

OTHER PUBLICATIONS

JP Office Action, dated Dec. 22, 2015; Application No. 2013-553022.

* cited by examiner

CATALYSTS FOR USE IN STEAM REFORMING PROCESSES

This invention relates to a method for preparing supported catalysts suitable for use in steam reforming processes.

Steam reforming, whereby a hydrocarbon feedstock such as natural gas or naphtha, or methanol, is reacted at elevated temperature and pressure with steam in order to generate a hydrogen-containing gas mixture, known as synthesis gas, is well established. The catalysts for steam reforming of hydrocarbons are typically based nickel catalysts supported directly on shaped refractory metal oxide supports such as calcium- or magnesium-aluminate or alpha alumina. In smaller-scale steam reforming processes, e.g. in the production of hydrogen gas mixtures for fuel cells, or in bio-syngas generation from biomass, precious metal catalysts such as Rh or Pt catalysts may be used. For steam reforming of methanol, Cu or Pd catalysts may be used.

These catalysts are typically prepared by an impregnation/calcination technique whereby the active metal is applied to a porous support as an aqueous solution, often of the metal nitrate, followed by calcination to convert the metal nitrate to the corresponding metal oxide. Before use, the metal oxide is reduced, typically with a hydrogen-containing gas to generate the active catalyst. The impregnation technique has become widely used, but there is a need to make more efficient use of catalytically active metal, both in order to minimise the production cost and to reduce the NOx emissions from nitrate-based catalysts.

We have found an alternative method that overcomes the problems of the previous preparative routes.

Accordingly the invention provides a method for preparing a catalyst suitable for use in a steam reforming process, comprising the steps of:
  (i) spraying a slurry containing a particulate catalyst compound, comprising one or more catalytic metals selected from the group consisting of Ni, Cu, Pt, Pd, Rh, Ru and Au, on to the surface of a shaped support in a pan coater to form a coated shaped support material,
  (ii) drying and optionally calcining the coated shaped support material to form a catalyst precursor having the catalytic metal in a surface layer, and
  (iii) optionally reducing the metal or metals in the catalyst precursor to a lower oxidation state to form the catalyst.

The invention further provides catalysts obtainable by the above method and the use of such catalysts for performing a catalytic steam reforming reaction.

The invention provides a means to produce coated catalysts particularly suited to pore-diffusion-limited reactions such as steam reforming reactions.

The particulate catalyst compound in the coating applied to the shaped support comprises one or more catalytically active metals selected from the group consisting of Ni, Cu, Pt, Pd, Rh, Ru and Au. Catalysts comprising one or more of Ni, Pt and Rh are preferred. Thus, in one embodiment, the catalytic metal in the particulate catalyst compound comprises Ni, optionally with one or more of Pt, Pd, Rh, Ru and Au. In another embodiment, the catalytic metal consists of Rh. In another embodiment, the catalytic metal in the particulate catalyst compound comprises Pt, optionally with one or more of Pd, Rh, Ru and Au, preferably comprising Pt and Rh, in which the weight ratio of Pt:Rh is in the range 1:1 to 6:1, preferably 2:1 to 4:1. In yet another embodiment, the catalytic metal in the particulate catalyst compound comprises Cu, optionally with one or more of Pt, Pd, Rh, Ru and Au.

The particulate catalyst compound in the coating applied to the shaped support may comprise an oxide, hydroxide or carbonate of the catalytically active metal, such as NiO, CuO or PtO. Thus the particulate catalyst compound may comprise a mixed oxide such as $CuO$—$ZnO$—$Al_2O_3$, $NiO$—$Al_2O_3$, $NiO$—$MgO$—$SiO_2$, $NiO$—$MgO$—$SiO_2$—$Al_2O_3$ or $NiO$—$MgO$—$SiO_2$—$CaO$—$Al_2O_3$, which may be formed, for example, by co-precipitation. Thus conventional reforming catalyst formulations may be prepared in powder form and applied as a coating onto the shaped support. However, preferably, the particulate catalyst compound comprises one or more metals selected from the group consisting of Ni, Cu, Pt, Pd, Rh, Ru and Au dispersed over the surface of a particulate catalyst support material. Thus the slurry is may be formed from a particulate catalyst support carrying one or more of the catalytically active metals. Suitable particulate catalyst support materials are oxides such as alumina, titania, zirconia, lanthana, magnesia, ceria, preferably zirconia stabilised with lanthana, yttria or ceria; metal-aluminates such as calcium aluminate and magnesium aluminate; and mixtures thereof. Zinc oxide may also be used, especially with alumina, for copper or palladium catalysts. Particularly preferred particulate catalyst support materials comprise alumina and/or stabilised zirconia, e.g. lanthana-stabilised alumina, ceria-zirconia-alumina, ceria-titania-alumina and ceria-magnesia-alumina materials. The particulate catalyst support particles preferably have an average particle size in the range 1-80 μm, preferably 1-50 μm. The metals dispersed over the surface of the particulate catalyst support material are preferably crystallites of the catalytic metal or catalytic metal oxide with an average crystallite particle size in the range 5-50 nm as determined by XRD. Metal contents in the supported composition used to form the slurry may be in the range 0.1-50% by weight. Due to their different activities, preferably the precious metals such as Pt, Pd, Rh, Ru and Au are present in an amount in the range 0.1-5% by weight, and the Ni or Cu present in an amount in the range 10-75% by weight.

The catalytic metal or metals may be dispersed over the surface of the particulate catalyst support material by conventional impregnation of soluble catalytic metal compounds onto the particulate catalyst support followed by drying and calcination to convert the catalytic metal compound or compounds to their respective oxides. Alternatively the catalytic metal or metals may be dispersed over the surface of the particulate catalyst support material by precipitation, using metals sols or by deposition-precipitation methods employing metal ammine salts that deposit insoluble metal compounds on the particulate catalyst support from solution upon heating.

By using the catalytic metals dispersed over the surface of a particulate catalyst support it is possible to produce catalysts with increased surface area and activity over conventional impregnated refractory oxide-supported catalysts that are calcined at high temperature. To form the slurry, the particulate catalyst compound is dispersed in a liquid medium, which is desirably aqueous. The solids content of the slurry may suitably be in the range 1060% wt. The slurry may suitably be formed using milling techniques used in the preparation of catalyst wash-coats. Binder materials such as alumina or hydrated alumina sols may be included in the layer and other conventional wash-coat preparation techniques may be applied, such as milling and mixing of the dispersion to achieve the desired particle size prior to coating the support. In a preferred embodiment, polyethylene graft co-polymers such as Kollicoat™ are included in the slurry. These materials, which have been used in pharmaceutical tablet coating, lower the surface tension of the Washcoat, thus enhancing the wetting and droplet formation in the spray, and lend a degree of plasticity to the coating enabling it to withstand the attrition that occurs in the coating process itself.

The shaped support is in the form of shaped units such as extrudates, pellets or granules, which may be prepared from powdered support materials, which may also comprise lubricants or binders. Extrudates and pellets are preferred shaped supports. The extrudates, pellets or granules may be commercially available or are readily prepared from suitable powders using methods known to those skilled in the art.

Shaped supports may have a variety of shapes and particle sizes, depending upon the mould or die used in their manufacture. For example the units may be in the form of spheres, cylinders, rings, or multi-holed units (e.g. 2-10 through holes), which may be multi-lobed or fluted, e.g. of cloverleaf cross-section. So-called "wagon-wheels" may also be used. The extrudates or pellets may be cylindrical, i.e. circular in cross-section, but are preferably lobed or fluted to increase their geometric surface area without increasing the pressure drop through a layer formed from the units. This has the advantage that the pressure drop through the catalyst is reduced while maintaining a satisfactory geometric surface area. Shaped units may be selected to impart high crush strength combined with high geometric surface area and low pressure drop. In this regard, 4-holed tetralobal, and 5-holed pentalobal fluted shaped units are preferred. Shapes which have a larger internal volume, such as so-called wagon-wheels, may reduce the loss the catalyst coating by attrition and so may be particularly useful.

The invention allows high voidage, high geometric surface area, low pressure-drop shapes that normally would be considered unsuitable to be used. This is because it is possible to calcine or fire the shaped supports to very high temperatures, e.g. >900° C., to achieve the necessary crush strength without ruining the porosity and catalytic metal crystallite surface area as would be the case with impregnated catalysts. The necessary porosity and catalyst surface area are provided by the inclusion of the metal in the subsequently applied coating which is dried and optionally calcined at lower temperatures. Thus the method allows both the strength and catalyst activity to be maximised.

The shaped units desirably have a smallest unit dimension preferably in the range 1 mm to 50 mm. The smallest dimension may be width, e.g. diameter or length, e.g. height. The shaped units may have a length from 1 mm to 50 mm, preferably 1.2 mm to 25 mm. The cross sectional width or diameter of the shaped units may be from 1 mm to about 25 mm, preferably from 1.2 mm to 10 mm, particularly from 1.2 mm to 5 mm. The aspect ratio, i.e. the largest dimension divided by the smallest dimension e.g. length/cross-section, is preferably less than 10, more preferably less than 5, most preferably ≤2.

The shaped support is preferably made of a refractory oxide such as alumina, magnesia, ceria, titania or zirconia, calcium aluminate or magnesium aluminate; and mixtures thereof, including layered structures in which the shaped support comprises two or more support oxides in a layered arrangement. Alpha alumina and calcium- or magnesium-aluminate shaped supports are particularly preferred.

The catalytic metal is present within a layer on the surface of the shaped support. The layer may be applied to particulate shaped units by spraying the slurry onto heated, tumbling shaped support units in a pan coater, which may be of the type used in the pharmaceutical or foodstuff industry for preparing coated tableted products. Such apparatus is commercially available. Multiple sprays may be applied with drying in-between spraying. The slurry is preferably applied to supports at temperatures in the range 30-60° C., preferably 30-50° C. In this way the support is not over-wetted and the possibility of spray-drying the slurry is avoided.

The resulting coated shaped support material is then dried. The drying step may be performed at 20-150° C., preferably 20-120° C., more preferably 95-110° C., in air or under an inert gas such as nitrogen, or in a vacuum oven for a period as required up to 24 hours.

The thickness of the layer containing the catalytically active metal in the dried material is preferably in the range 5 to 250 μm (micrometres), but more preferably is in the range 50-250 micrometres, most preferably 10-200 micrometres. Thinner layers make more efficient use of the applied metal. The thickness of the catalytic metal-containing layer may be determined by methods known to those skilled in the art, such as optical microscopy or electron microprobe analysis.

In one embodiment of the invention, multiple layers are applied to the shaped support. In particular, one or more intermediate layers maybe disposed between the surface catalyst layer and the shaped support. Such intermediate layers may be un-catalysed and preferably comprise a material with an intermediate coefficient of thermal expansion lying between that of the shaped support and that of the catalyst coating layer. In this way loss of catalyst layer from the shaped support by thermal shock or attrition may be reduced. Alternatively a barrier layer may be applied to the catalyst to improve chemical compatibility, particularly for high-temperature applications.

If desired, the dried catalyst precursors may be calcined, i.e. heated at temperatures above 250° C., for example 250-900° C. in air or an inert gas such as nitrogen to convert any non-oxidic metal compounds on the surface of the shaped support to their respective oxides and to burn out any organic components such as Kollicoat that may be present in the slurry.

The catalytic metal in the surface layer of the precursor may comprise a mixed oxide or a coating having a perovskite, pyrochlore, hydrotalcite or layered-double hydroxide structure.

The dried or calcined catalyst precursor may then be provided to the steam reformer vessel. If reducible metals are present, the catalyst precursor is desirably reduced to generate the active reduced catalyst in-situ. Alternatively, the catalyst may preferably be provided in 'pre-reduced' form, where the dried or calcined catalyst precursor is subjected to a reduction step so that at least part of the reducible metal is transformed into the elemental 'zero-valent' state.

Thus a reduction step may be performed by passing a hydrogen-containing gas such as hydrogen, synthesis gas or a mixture of hydrogen with nitrogen or other inert gas over the dried or calcined catalyst precursor at elevated temperature, for example by passing the hydrogen-containing gas over the composition at temperatures in the range 200-600° C., preferably for between 1 and 24 hours at atmospheric or higher pressures up to about 25 bar.

Catalysts having metals in the elemental or zero-valent state can be difficult to handle as they can react spontaneously with oxygen in air, which can lead to undesirable self-heating and loss of activity. Consequently reduced nickel and copper catalysts suitable for steam reforming processes are preferably protected by passivating the surface of the reduced metal with a thin layer of oxide. This may be produced by treating the reduced catalyst with a dilute air/nitrogen, dilute oxygen/nitrogen or $CO_2$ gas mixture using known techniques.

The catalysts prepared according to the invention may be used in reforming processes such as primary steam reforming, secondary reforming of a primary reformed gas mixture, autothermal reforming and pre-reforming. The catalysts may also be used for reforming by catalytic partial oxidation, alone or in combination with steam reforming. The catalysts may also be used for methanation reactions and hydrogenation reactions.

In reforming, a hydrocarbon, typically a methane-containing gas such as natural gas, or naphtha, or a liquid fuel such as methanol, ethanol diesel, gasoline or liquid-petroleum-gas (LPG), is reacted with steam and/or, where appropriate, carbon dioxide, over a catalytically active material to produce a gas containing hydrogen and carbon oxides. The hydrogen producing reactions are:

$$CH_4 + H_2O \leftrightarrow H\ CO + 3H_2$$

$$\text{"}CH_2\text{"} + H_2O \rightarrow CO + 2H_2$$

("CH2" represents hydrocarbons higher than methane, for example normally gaseous hydrocarbons and normally liquid hydrocarbons boiling at up to 200° C.). The analogous reactions with carbon dioxide can be carried out separately or with the steam reaction.

$$CH_4 + CO_2 \rightarrow 2CO + 2H_2$$

$$\text{"}CH_2\text{"} + CO_2 \rightarrow 2CO + H_2$$

Methanol reacts with steam according to the following equation.

$$CH_3OH + H_2O \rightarrow CO_2 + 3H_2$$

Steam reforming reactions are strongly endothermic and the process is especially suitable when they are carried out with external heating as in tubular steam reforming. Alternatively the heat can be supplied by heating the reactants and passing steam over the catalyst in an adiabatic bed or in a hybrid process in which oxygen is also a reactant, so that heat evolved in oxidation is absorbed by the endothermic steam reforming reactions. The hybrid process can be applied to the product of the tubular or adiabatic process that is, in "secondary reforming", or to fresh feedstock ("catalytic partial oxidation" or "autothermal reforming"). In autothermal reforming, the oxygen and steam may be reacted simultaneously with the hydrocarbon over the reforming catalyst or the reforming catalyst may be disposed downstream of a non-catalytic partial combustion step.

The catalysts may also be used in the reforming of coal- or biomass-gasifier effluents to reform methane and higher hydrocarbons, including tars into gas streams comprising hydrogen and carbon oxides.

For the production of hydrogen-containing synthesis gas from natural gas or naphtha using nickel or precious metal catalysts, the outlet temperature is preferably at least 500° C. While the temperature with Ni catalysts is generally in the range 750-900° C. for making synthesis gas for ammonia or methanol production, it may be as high as 1100° C. for the production of metallurgical reducing gas, or as low as 700° C. for the production of town gas. For the hybrid process using oxygen, the temperature may be as high as 1300° C. in the hottest part of the catalyst bed. Methanol reforming over copper or palladium catalysts is preferably carried out at lower temperatures, e. in the range 200-250° C.

The pressure in steam reforming processes is typically in the range 1-50 bar abs. but pressures up to 120 bar abs. are proposed. An excess of steam and/or carbon dioxide is normally used, especially in the range 1.5 to 6, for example 2.5 to 5, mols of steam or carbon dioxide per gram atom of carbon in the starting hydrocarbon.

In the catalytic reforming of a gasifier effluent containing methane and higher hydrocarbons, including tars, the gasifier effluent containing steam may be treated in one or more steps using the catalysts of the present invention. For example a supported Rh catalyst or a supported Pt/Rh catalyst may be used alone or downstream of a supported Ni reforming catalyst to reform both the tars and methane in the gasifier effluent. Preferably, dust- and/or carbon-containing solids are separated from the gas before the reforming step, for example by physical separation methods such as cyclones, filters, scrubbers or deflectors. As the catalysts are stable to high temperatures, they may be used directly after the gasification without cooling the gasifier effluent but because they have a high activity, they may also be used after some cooling of the effluent has taken place. Gasifier effluent reforming is preferably performed at temperatures in the range 500-1000° C. at the gasifier effluent pressure.

Figure 2:
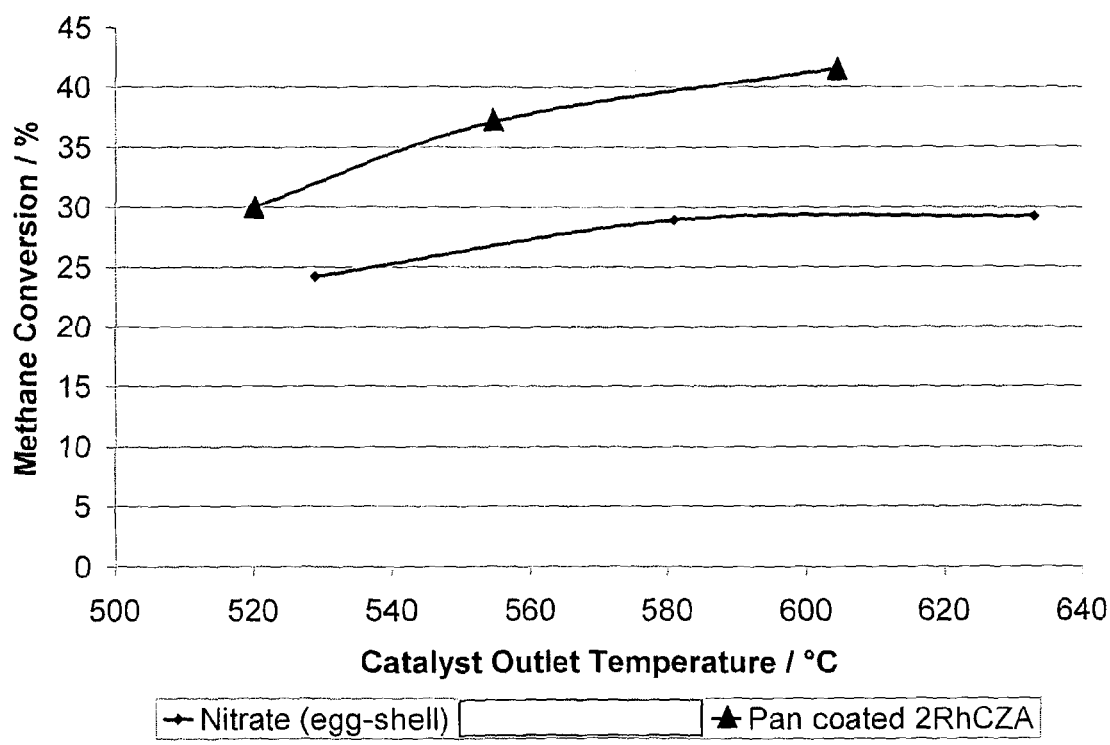

The invention will now be further described by reference to the following examples and FIGS. 1 and 2. FIG. 1 is an optical micrograph of a catalyst precursor prepared according to the method of Example 1. FIG. 2 is a chart of methane conversion vs temperature for the catalyst of Example 1 and a comparative method catalyst.

Pellet coating was carried out using a Profile Automation Pilot XT bench top-side vented pan coater. The coating was applied with a spray nozzle fed by a peristaltic pump (Watson Marlow 101U/R) that supplies the washcoat to the pan coater through silcone tubing (5 mm id).

Slurries were pre-milled using an Eiger Torrence minimotor mill 250 using 1 mm YSZ beads as the milling media. The particle size distribution was measured using a Malvern Mastersizer laser diffraction particle size analyser.

Slurry pH was measure using a Jenway 370 pH meter and the slurry solids content was measured using a Sartorius MA45 solids content balance Example 1

Preparation of Catalyst

A 2% Rh/30% $Ce_{0.75}Zr_{0.25}O_2$-70% $Al_2O_3$ powder (470 g) was dispersed in demineralised water to make a 45% solids slurry. This was milled for 8 mins at 350 rpm and a resulting D50 of 2.2 microns was obtained. The pH of 478 g of washcoat was adjusted from 6.7 (natural) to 4.0 by addition of acetic acid and Dipseral P3 alumina (Sasol) was added (21.5 g) followed by mixing with a high shear head on a Silverson (20 mins at ca. 3000 rpm). Kollicoat IR (17.6 g (8% wrt catalyst) previously dissolved in demineralised water (150 ml) was added and the final weight of the washcoat was 705 g. 388 g of this washcoat was applied to 1 L (1180 g) of alpha-alumina cloverleaf-shaped tablets in a pan coater. The coatings parameters were as follows T inlet (50° C.), pan speed (20 rpm), pump speed (18 rpm), pan depression (−30 Pa). The coating took 29 minutes. The product was calcined at 500° C. for 2 hours. The resultant catalyst layer was 100-150 microns thick.

FIG. 1 depicts the catalyst precursor, having a catalyst containing catalyst outer layer on a core of shaped alpha alumina.

Example 2

Testing

The coated pellets of Example 1 were tested for methane steam reforming activity. 24 pellets plus 24 uncoated pellets were placed in a 1" diameter×2.2" long reactor tube. Steam-methane reforming was performed at a steam: carbon ratio of 3.25 at 1 atm pressure.

FIG. 2 compares a 0.2% Rh/$CaAl_2O_4$ catalyst prepared by a conventional incipient wetness impregnation using Rh—nitrate solution with the pan coated catalyst above (denoted as 2Rh/CZA). The incipient wetness catalyst has Rh dispersed throughout the surface of the support at a depth of up to 500 micrometers, whereas the coated catalyst prepared in the pan coater has an outer layer containing the Rh. The pan coated catalyst, with a Rh loading of 0.15%, out-performed the comparative impregnated catalyst in terms of methane conversion across the whole temperature range investigated, despite having a significantly lower Rh content.

The invention claimed is:

1. A method for preparing a catalyst suitable for use in a steam reforming process, comprising the steps of:
   (i) spraying a slurry containing a particulate catalyst compound, comprising one or more catalytic metals selected from the group consisting of Ni, Cu, Pt, Pd, Rh, Ru and Au, on to the surface of a shaped support in a pan coater to form a coated shaped support material having the catalytic metal in a surface layer, wherein the solids content of the slurry is in the range 1-60% by weight, and
   (ii) drying the coated shaped support material to form a catalyst precursor,
      wherein the shaped support comprises extrudates, pellets or granules having a length of 1 mm to 50 mm, a cross sectional width or diameter of 1 mm to 25 mm, and an aspect ratio of length/cross-section ≤2.

2. The method according to claim 1 wherein the catalytic metal in the particulate catalyst compound comprises Ni, optionally with one or more of Pt, Pd, Rh, Ru and Au.

3. The method according to claim 1 wherein the catalytic metal in the particulate catalyst compound comprises Pt, optionally with one or more of Pd, Rh, Ru and Au.

4. The method according to claim 1 wherein the catalytic metal in the particulate catalyst compound consists of Rh.

5. The method according to claim 1 wherein the particulate catalyst compound comprises an oxide, hydroxide or carbonate of the catalytically active metal.

6. The method according to claim 1 wherein the particulate catalyst compound comprises one or more metals selected from the group consisting of Ni, Cu, Pt, Pd, Rh, Ru and Au dispersed over the surface of a particulate catalyst support material.

7. The method according to claim 6 wherein the particulate catalyst support material is selected from the group consisting of alumina, titania or zirconia, zinc oxide, lanthana, magnesia, ceria, metal-aluminates and mixtures thereof.

8. The method according to claim 6 wherein the particulate catalyst support material comprises alumina and/or stabilised zirconia.

9. The method according to claim 1 wherein one or more intermediate layers are applied between the shaped support and the catalytic surface layer.

10. The method according to claim 1 wherein the shaped support units are multiholed-pellets or extrudates with a cross-section that is circular, lobed or fluted.

11. The method according to claim 1 wherein the shaped support is a refractory oxide comprising a support oxide selected from the group consisting of alumina, ceria, magnesia, titania or zirconia, calcium aluminate or magnesium aluminate; and mixtures thereof.

12. The method according to claim 1 wherein the shaped support is calcium aluminate, magnesium aluminate or alpha alumina.

13. The method according to claim 1 wherein the support is coated at a temperature in the range 30-60° C.

14. The method according to claim 1 wherein the thickness of the layer containing the catalytically active metal in the dried material is in the range 5 to 250 μm.

15. The method according to claim 1 wherein a polyethylene graft co-polymer is included in the slurry.

16. The method according to claim 1 wherein the dried coated support material is calcined.

17. The method according to claim 16 wherein the calcined coated support material is reduced.

18. The method according to claim 17 wherein the reduction is performed by passing a hydrogen-containing gas over the catalyst at a temperature in the range 200-600° C. for between 1 and 24 hours at atmospheric or higher pressures up to about 25 bar.

19. The method according to claim 17 wherein the reduced catalyst is passivated.

20. The method according to claim 1 wherein the catalytic metal in the particulate catalyst compound comprises Pt with Rh.

* * * * *